United States Patent Office 3,498,938
Patented Mar. 3, 1970

3,498,938
MULTISTAGE, SEMICONTINUOUS PROCESS FOR THE EMULSION POLYMERIZATION OF VINYL ESTERS OF ALPHA-BRANCHED MONOCARBOXYLIC ACIDS
Einte P. Grommers, Fritz T. J. Oeverhaus, and Jacobus J. Tjepkema, The Hague, Netherlands, assignors to Shell Oil Company, New York, N.Y., a corporation of Delaware
No Drawing. Filed Sept. 8, 1967, Ser. No. 666,500
Int. Cl. C08f 1/06, 1/13
U.S. Cl. 260—17                     8 Claims

ABSTRACT OF THE DISCLOSURE

Copolymer latices of vinyl esters of alpha-branched monocarboxylic acids having excellent stability to hydrolysis and saponification as well as improved storage stability, free-thaw stability and salt(ion) resistance are prepared by a multistage process wherein the monomers are added to a reactor which is partially filled with a previously formed latex until the reactor is full, whereupon a portion of the latex is transferred to a second reactor for completion of the copolymerization.

BACKGROUND OF THE INVENTION

The preparation of latices by emulsion polymerization of vinyl esters, as, for example, vinyl acetate is known. Such polyvinyl ester latices are frequently applied in latex paints. For this application, plasticizers are often added to reduce the temperature at which the polyvinyl particles can coalesce to a coherent film when the water evaporates. In general, however, the dispension agent systems recommended for the preparation of vinyl ester latices do not lead to the formation of stable latices. These shortcomings were obviated to a great extent by the one-step process described in U.S. Patent application Ser. No. 350,528, filed Mar. 9, 1964, now U.S. 3,370,031, issued Feb. 20, 1968, wherein a vinyl ester of an alpha, alpha-dialkyl monocarboxylic acid is copolymerized with vinyl chloride and acrylic acid in the presence of anionic and nonionic surface-active agents.

In this process the monomers and other reaction components are added with stirring and cooling to a reactor at such a rate, that the reaction temperature is maintained at, for example, 70–90° C. In smaller reactors with a capacity of not more than 350 to 500 liters, this works out at a reaction time of about 4 hours. In larger reactors, however, the more unfavorable ratio of capacity to cooling area leads to a relatively smaller heat removal capacity. This necessitates undesirably long reaction periods of, for example, 20 hours and longer.

Another known technique is to conduct emulsion copolymerizations in two steps. Thus, in a stirred main reactor the reaction components can be added continuously with continuous withdrawal of part of the latices formed, which are subsequently passed through a tubular reactor to complete the copolymerization. In this method, the heat removal, also on a larger scale, in general, does not present a problem, but undesirable sedimentation occurs. Continuous processes often have advantages on a larger scale only; however, moderate production of a wide range of latices calls for a simpler process.

The present invention now obviates these drawbacks by using a semicontinuous method which permits rapid preparation of a stable product on a larger scale in simple conventional units.

SUMMARY OF THE INVENTION

The instant invention relates to a process for the preparation of latices by emulsion polymerization of vinyl esters of alpha-branched, saturated monocarboxylic acids. More particularly, the invention provides a semicontinuous, multistage process for polymerizing vinyl esters of saturated, aliphatic monocarboxylic acids branched at the alpha position with one or more other comonomers containing an ethylenically unsaturated double bond in an aqueous emulsion containing surfactants.

Specifically, the invention provides a process for the preparation of mechanically-stable, freeze-tolerant latices by means of a semicontinuous, multistage emulsion copolymerization of vinyl esters of saturated α-alkyl- and/or α,α-dialkylmonocarboxylic acids having at least 5 carbon atoms in the acid radical, with at least one other copolymerizable monomer containing an olefinically unsaturated double bond, wherein one starts with a 25–75% charge in a reactor containing an already formed copolymer latex, which reactor is provided with a stirring and a cooling/heating device, after which, under copolymerization conditions and, preferably, in the presence of a protective colloid, additional comonomers are added at such a rate that, applying cooling, the reaction temperature remains at the preselected desired level until the reactor is filled, after which, to complete the copolymerization, 25–75% of the latex formed is passed into a second reactor, which is also stirred and cooled or heated until the copolymerization is substantially complete. The latex may then be stored or formulated into paints.

BRIEF DESCRIPTION OF PREFERRED EMBODIMENT

The essential feature of the present process is that the process is performed in a multistage and preferably a two-stage, semicontinuous manner.

Suitable vinyl esters of the saturated alpha-alkyl and/or alpha,alpha-dialkyl monocarboxylic acids are those derived from alpha-branched, saturated, aliphatic monocarboxylic acids containing at least 5 carbon atoms in the acid molecule, and most preferably from about 5 to 20 carbon atoms.

Suitable such alpha-branched, saturated, monocarboxylic acids may be represented by the general formula:

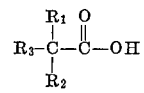

wherein $R_1$ and $R_2$ each represent the same or different alkyl radicals of normal, branched or cyclic structure and $R_3$ represents hydrogen or a hydrocarbyl radical, preferably an alkyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals of normal branched or cyclic structure, including methyl, ethyl, propyl, butyl, etc., as well as alkaryl, aralkyl and aryl radicals; however, alkyl radicals are preferred. Very suitable such monocarboxylic acids include the alpha,alpha-dialkyl monocarboxylic acids containing a total of from 5 to 20 carbon atoms. A preferred group of monocarboxylic acids are those containing a mixture of monocarboxylic acids containing from 9 to 11 carbon atoms and derived from a $C_8$–$C_{10}$ olefin mixture by the well-known Koch synthesis and subsequent modifications thereof. Suitable methods for the preparation of these acids are disclosed in U.S. 3,059,005, U.S. 3,059,006, U.S. 3,059,007, U.S. 3,047,662, U.S. 3,186,974 and in "Carbonsaire-Synthese our Olefinen, Kohlenoxyd and Wasser," Koch, Brennstoff-Chemie, November 1955, pages 321–328.

As saturated, aliphatic, monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated, aliphatic, monocarboxylic acids branched at the alpha position and prepared in this manner are sometimes called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting materials. These mixtures may contain both branched and unbranched acyclic olefins as well as cycloaliphatic olefins. By the action of formic acid or carbon monoxide and water, a mixture of saturated acyclic and cycloaliphatic monocarboxylic acids is obtained therefrom.

Although the starting materials for preparing the monocarboxylic acids are olefinic fractions containing, in general, a carbon atom range of 2–3 carbon atoms such as $C_8$–$C_{10}$, other olefinic starting materials such as isobutylene, propylene trimer and diisobutylene, may be utilized. The branched carboxylic acids or mixtures thereof prepared from these hydrocarbons are exclusive acyclic.

These monocarboxylic acids are converted into their respective vinyl esters by conventional techniques such as by vapor phase reaction of the acids with acetylene in the presence of a suitable catalyst such as cadium silicate on pumice. The resulting vinyl esters may be recovered by distillation under reduced pressure and washed with dilute caustic soda and water to remove traces of monocarboxylic acids if desired. Another suitable method for converting the monocarboxylic acids to their vinyl esters is by reacting said acids with vinyl acetate in the presence of mercury acetate and phosphoric acid.

Preferred copolymerizable ethylenically unsaturated monomers are those containing on either side of the double bond or bonds up to about 12 carbon atoms, and especially those containing up to about 8 carbon atoms on either side of the double bond(s).

Examples of such compounds are vinyl acetate and vinyl esters of other carboxylic acids, such as pivalic acid, vinyl chloride, vinylidene chloride, vinylidene acetate, acrylonitrile, esters of unsaturated carboxylic acids, such as methyl acrylate, ethyl methacrylate, maleic acid, diethyl maleate and dibutyl fumarate, and unsaturated hydrocarbons, such as ethylene, propylene, styrene, alkyl substituted styrenes, conjugated dienes such as butadiene, isoprene, and the like.

In practice, it may be desirable to use two or more of these monomers, with the ratio of monomers preselected with the end use of the particular latices in mind.

Thus, excellent paint latices are obtained by copolymerizing the vinyl ester of the alpha-branched monocarboxylic acids with vinyl chloride and carboxylic acid or partial carboxylic ester thereof, in which carboxylic acid or partial ester occurs a pair of carbon atoms connected by a double bond, of which at least one is bound directly to a carboxy group, or salts or anhydrides thereof. Before, during or after the polymerization, the usual polyvinyl chloride stabilizers may be added, if desired.

The last-mentioned carboxylic acids are preferably alpha, beta-unsaturated carboxylic acids, such as acrylic acid, methacrylic acid, maleic acid, fumaric acid and itaconic acid. Instead of these carboxylic acids certain partial carboxylic esters may be used, such as mono-alkyl esters of maleic acid, fumaric acid and itaconic acid and also monovinyl esters of saturated aliphatic dicarboxylic acids, such as monovinyl succinate. Such acids or partial esters can also be used in the form of salts, such as sodium, potassium or ammonium salts. Quantities of between 0.5 and 5 parts by weight of acid or partial ester per 100 parts by weight of monomers are in general suitable. Acrylic acid and methacrylic acid are preferred.

By a suitable choice of kind and quantity of the vinyl esters of the saturated alpha-alkyl- and/or alpha,alpha-dialkylmonocarboxylic acids one may obtain a latex whose particles may coalesce in the paint layer when the water is evaporated, even at room temperature. This can be achieved, for example, by starting from vinyl esters of the alpha-branched monocarboxylic acids containing at least 7 carbon atoms per acid molecule, together with vinyl chloride and the unsaturated carboxylic acid or the partial ester. If the alpha-branched monocarboxylic acids contain 9–11 carbon atoms per molecule, the desired results may be expected by combining 25–900 parts by weight of the vinyl esters of the alpha-branched, saturated, aliphatic monocarboxylic acids with 100 parts by weight of the copolymerizable comonomer, viz, vinyl chloride. For application in latex paints, the best results are obtained by combining 80–225 parts by weight of the above vinyl esters of branched monocarboxylic acids with 100 parts by weight of vinyl chloride.

Monomeric vinyl esters of the saturated alpha-branched monocarboxylic acids and the mutual ratio thereof with the other olefinically unsaturated monomers can also be chosen such that polymer particles thereof can coalesce at temperatures other than room temperature, for example for the preparations of latices for stoving lacquers, for glues, or for the preparation of articles, such as sheets, plates and the like.

Vinyl esters or mixtures thereof which can be used to advantage together with vinyl chloride are those derived from the following branched monocarboxylic acids: acids prepared by reaction of carbon monoxide and water with cracked olefins containing 8–11 carbon atoms per molecule, with cracked olefins containing 12–14 carbon atoms per molecule, with cracked olefins containing 14–18 carbon atoms per molecule, with propylene trimer or with propylene tetramer.

The emulsion copolymerization according to the invention is performed in the presence of emulsifiers or surfactants. One preferably uses a combination of anionic and nonionic surface-active agents. Small quantities of emulsifiers already give sufficient stability. The anionic surface-active agents are, as a rule, used in a quantity of at least 0.5 part by weight per 100 parts by weight of monomers. In some cases smaller quantities can be used, but these are often not sufficiently effective. In general, quantities of between 0.5 and 2 parts by weight per 100 parts by weight of monomers are preferred. The quantity of nonionic surface-active agent or agents may in general, vary between 0.5 to 6 percent by weight, calculated on total monomers. Quantities of between 1 and 3 percent by weight are preferred.

Suitable anionic surface-active agents are for example alkyl-aryl sulfonates, such as alkylbenzene sulfonates. Such alkylbenzene sulfonates can, as is known, be prepared by alkylation of benzene with for example propene tetramer, unbranched olefins, or chlorinated kerosine, followed by sulfonation and neutralization of the sulfonic acid obtained, in which if desired disulfonic acids and sulfuric acid salts can be removed. Other suitable anionic surface-active agents are for example salts of sulfosuccinic esters such as the dihexyl ester, the dioctyl ester and the ditridecyl ester. Other suitable anionic surface-active agents are for example alkyl sulfonates, alkyl sulfates, sulfates of alcohol ethoxylates, sulfates of alkyl-phenoxy-polyethoxyethanols, sulfates and sulfonates of hydroxypropyl esters of monocarboxylic acids and sulfates of monoglycerides of monocarboxylic acids. Compounds are preferred. In addition, mixtures of said anionic surface-active agents may be used Suitable nonionic surface-active agents are for example reaction products of hydroxy compounds with one or more alkylene oxides such as ethylene oxide and propylene oxide. Very suitable are reaction products of phenols with alkylene oxides, such as reaction products with the general formula R—$C_6H_4$—O(—$CH_2$—$CH_2$—O—)$_n$H, where R represents an alkyl group with 6–16 carbon atoms and $n$ is a number between 6 and 40. Preferred compounds are those in which R represents an octyl or a nonyl group. Such compounds can be prepared in a known way by alkylation of phenol with olefins, such as diisobutene or propene trimer, followed by the action of ethylene oxide.

Other suitable nonionic surface-active agents are reaction products of ethylene oxide with polypropylene glycol ethers. Preferred compounds are those obtained by reacting 60–90 parts by weight of ethylene oxide per 100 parts by weight of product. Other suitable nonionic surface-active agents are reaction products of ethylene oxide with monocarboxylic acids such as lauric acid, palmitic acid, stearic acid or mixtures of fatty acids; furthermore, reaction products of ethylene oxide with alcohols such as octyl alcohol, lauryl alcohol or octyl alcohol. If desired, also mixtures of said nonionic surface-active agents may be used.

An essential condition for the present invention is the presence during the copolymerization of a lyophilic protective colloid, such as for example gelatin, agar, gum arabic, starch, cellulose and ethers and esters thereof, polyvinyl alcohol or partially hydrolysed polyvinyl acetate, copolymers of acrylic acid and acrylic esters, a polymer of acrolein solubilized with sodium bisulfite, and the like. Good results were obtained in particular with the ethers and esters of cellulose, such as hydroxyethyl cellulose and carboxymethyl cellulose. The protective colloid is usually applied in quantities of 0.1–10 percent by weight, preferably 1–5 percent by weight, calculated on the monomers.

The copolymerization can be initiated and/or catalyzed with conventional means. As a rule radical-donating substances are added, such as peroxides, for example benzoyl peroxide and ditert-butyl peroxide and diazo compounds, such as alpha,alpha'-azoisobutyronitrile. Frequently also redox systems are used. Preferably water-soluble per compounds are employed, such as potassium persulfate and hydrogen peroxide. The copolymerization temperature is usually between 30 and 150° C., in particular between 50 and 100° C. Also, the polymerization can be further promoted by irradiation such as ultraviolet light. The amount of catalyst may range from 0.001 to 5% by weight of monomers.

Copolymerization of the present vinyl ester mixtures is exothermic. The working pressure is chosen such that during polymerization no boiling phenomena occur. For this purpose one usually employs reactors capable of withstanding pressures up to 15-30 atm.

The polymerization is preferably performed with exclusion of oxygen or air. For this purpose, base materials such as water, vinyl esters and other monomers can previously be liberated from oxygen, as, for example, by boiling or distillation, while passing through indifferent oxygen-free gases, such as nitrogen, helium, argon or neon. The air is preferably first removed from the reaction apparatus by one of the above-mentioned inert gases.

The copolymerization can further be carried out in many ways. At the start of the process according to the invention the first reactor is filled with an already formed copolymer latex to 25–75%, and preferably 40–60% of the available volume. This initial charge will mostly be what was left of a previous, batchwise copolymerization.

However, the initial charge can also be obtained in a different way. To start the cycle, i.e., with an empty first reactor, this reactor is preferably charged with an aqueous solution of emulsifier and initiator, after which at the desired reaction temperature, simultaneously an aqueous solution of emulsifiers and, if necessary, inhibitor and a monomer mixture, or, preferably, a monomer emulsion is added, until the reactor is filled either completely or substantially. The rate of addition depends on the heat discharge capacity of the reactor and is controlled to keep the reaction mixture at the desired copolymerization temperature. It is desirable, however, to check the acidity of the reaction mixture. Thus, in copolymerizing the vinyl esters of alpha-branched saturated carboxylic acids with vinyl chloride and unsaturated carboxylic acids or partial esters, the pH of the reaction mixture will preferably be kept between 4 and 5, for example, by addition of alkaline compounds, such as $K_2CO_3$, NaOH, etc.

The time necessary for this first cycle, starting from the empty reactor, depends on the reaction conditions chosen and the size of the apparatus in connection with the heat discharge, and may vary from 2 to 20 hours. When the reactor is completely or substantially charged, i.e., to an extent of at least 75%, in particular 85%, 25–75% of the contents can be passed to the second reactor, to complete the copolymerization, preferably with addition of the remaining quantity, in partcular 0.05–1% w., calculated on the monomers added, of the watered-soluble peroxide such as potassium persulfate. In the second reactor the copolymerization will mostly be completed within ¼ to 3 hours, if the same or slightly higher copolymerization temperatures, preferably between 75 and 100° C., are adhered to. To increase the stability of the latex end product it is desirable to raise its pH to a value of between 7 and 9, as, for example, by adding ammonia and/or ammonium carbonate.

When proceeding as described above, the first reactor will contain a 25–75% charge of an already formed polymer latex. According to the invention, the comonomers, the protective colloid and the other reaction components are added to it at such a rate that, using cooling, the reaction temperature remains at the desired level. In a period of 2–6 hours the reactor will then be mostly full again, after which again 25–75% of the reactor contents are charged to the second reactor, etc., as described hereinbefore.

The second reactor may have a smaller capacity than the first, for example a capacity of 25–75% of that of the first reactor. The copolymerization in it is completed as described above.

Latices prepared according to the invention distinguish themselves from copolymer latices prepared in a different way by increased stability to hydrolysis and saponification. In general, they are very stable during storage, shaking or stirring and exhibit excellent resistance to the action of solutions of salts which contain monovalent and/or polyvalent ions, and also against repeated freezing and thawing.

Latices according to the invention and latex paints prepared with them show very good adhesion to many kinds of materials such as wood (also after priming), stone, concrete and asbestos cement. Paint coats from such paints excel by great stability to chemical and mechanical influences, they have a low water absorption, they exhibit excellent resistance to the influence of alkaline substances such as concrete, or alkaline detergents; they also exhibit excellent resistance to wet-brushing with water and with detergents. The latices are also suitable as an adhesive and as impregnation agents for paper.

The following examples are presented in order to illustrate the process and polymers of the instant invention. The reactants, and their proportions, and other specific ingredients of the recipes are presented as being typical and various modifications may be made in view of the foregoing disclosure and discussion, without departing from the spirit or scope of the disclosure or of the claims. Unless otherwise specified, parts and percentages are given by weight.

EXAMPLE I

The vinyl esters of the alpha-branched monocarboxylic acids were prepared from a mixture of alpha-branched, saturated, aliphatic monocarboxylic acids containing from 9 to 11 carbon atoms obtained by reacting a mixture of $C_8$–$C_{10}$ cracked olefins with carbon monoxide and water in the presence of acidic catalysts.

These alpha-branched acids containing 9 to 11 carbon atoms were prepared as follows:

An alkene fraction containing from 8 to 10 carbon atoms and consisting of approximately 52% straight chain, 26% branched-chain and 22% cyclic alkenes were converted into monocarboxylic acids at 50° C. in a reaction mixture while the composition was kept constant. The hydrocarbon mixture containing the olefins was fed at a rate of 0.7 l./h. The catalyst, which consisted of $H_3PO_4$, $BF_3$ and $H_2O$ in the molar ratio of 2:3:2, was fed at a rate of 1.4 l./h. The liquid part of the reaction mixture was kept at a volume of 3 liters. The liquid was kept under a carbon monoxide pressure of 70 atmospheres absolute. Vigorous stirring was applied. The apparatus consisted of chrome-nickel steel.

In the reaction mixture leaving the reaction chamber, the two liquid phases were separated. The phase containing the mixed carboxylic acids was washed continuously and countercurrently at 40° C. with 5% by volume of water and subsequently at 20° C., also continuously and countercurrently successively with another 10% by volume of a 1% solution of sodium citrate in water and with 10% by volume of a 5% solution of sodium bicarbonate in water.

The mixed monocarboxylic acids were extracted from it continuously with excess ammonia in water. From the solution of the ammonium salts, the free and bound ammonia was evaporated continuously. The mixed monocarboxylic acids separated as a liquid, and were subsequently dried and distilled in vacuo.

These purified alpha-branched, saturated, aliphatic monocarboxylic acids were then converted in the vapor phase with acetylene into vinyl esters in the presence of a catalyst consisting of 24% cadmium silicate on pumice.

Dry acetylene was passed at a rate of 60 l./h. through a vessel in which the said monocarboxylic acids were kept at 200° C. The mixture of acetylene and vapor of the monocarboxylic acids was passed through a quartz tube with a diameter of 25 mm., which was kept in an electric furnace at 300–330° C. This tube had a length of 45 cm. and was filled with 150 ml. of said catalyst. The vapors leaving the tube were condensed. The condensate, which contained vinyl esters and also non-converted monocarboxylic acids, was distilled in vacuo.

The vinyl esters were distilled at a pressure of 0.5 mm. Hg at 45–65° C. To remove traces of monocarboxylic acids, the vinyl esters were washed with dilute caustic soda and with water.

(a) The following components were added to a 1500-liter enamelled autoclave, provided with a stirring and cooling or heating device and heated under nitrogen to 70° C.:

| | Kg. |
|---|---|
| Water | 375 |
| "Tergitol" 4 (a 25% by weight solution of the sodium salt of a secondary $C_{14}$ alkyl sulfate | 12 |
| Potassuim persulfate | 1 |
| Potassium carbonate | 0.2 |

Subsequently, while stirring and cooling, a monomer emulsion was added at the rate of 100 kg./hour, the temperature being maintained at 70° C.±4° C.

The monomer emulsion had been prepared at room temperature from the following components:

| | Kg. |
|---|---|
| Vinyl chloride | 245 |
| Vinyl ester of alpha-branched monocarboxylic acids containing 9 to 11 carbon atoms in the acid molecule and prepared as described above | 250 |
| Acrylic acid | 5 |
| Water | 225 |
| "Tergitol" 4 | 8 |
| Nonylphenoxypolyethoxyethanol containing, on the average, 30 ether groups per molecule | 15 |
| Potassium persulfate | 4 |
| Potassium carbonate | 3.55 |

(b) After 7½ hours half of the latex formed was pumped into a second 750-liter enamelled autoclave. After addition of 1.25 kg. of $K_2S_2O_8$ the reaction was continued for another hour at 85° C., after which the material was cooled to room temperature. Then another 6 kg. of "Tergitol" 4 and 10% ammonia were added to raise the pH from 4 to 5; subsequently another 3 kg. of ammonium carbonate were added as 10% solution in water to the latex. The latex was then ready for storage and was pumped from the second reactor.

(c) To the half-filled first reactor the following monomer emulsion was added at the rate of 150 kg./hour (parts by weight):

| | |
|---|---|
| Vinyl chloride | 49 |
| Vinyl ester of $C_9$–$C_{11}$ monocarboxylic acid described above in (a) | 50 |
| Acrylic acid | 1 |
| Water | 100 |
| Nonylphenoxypolyethoxyethanol (average 30 ether groups per molecule) | 3 |
| "Tergitol" 4 | 4 |
| Potassium persulfate | 0.5 |
| "Cellosize" WP09 (a hydroxyethyl cellulose) | 2 |

The reaction temperature was 70±3° C. After 4 hours, half of the reactor contents was pumped into the second reactor. Under these same conditions, the first reactor was again filled in 4 hours by pumping in 150 kg./hour of the emulsion described under (c).

(d) The latex pumped according to (c) into the second reactor was treated in the same way as described under (b), but with omission of the "Tergitol" 4 addition. The process described under (c) and (d) can be repeated in arbitrary number of times.

(e) The latices obtained according to (b) and (d) were combined, after which 8% by weight of an aqueous emulsion containing 52% by weight of dibutyl phthalate was added. The stability to stirring, the resistance to sodium chloride and calcium chloride and the freeze-thaw stability were investigated. These were excellent.

Latex films with a thickness of 150 microns applied to glass plates, gave after drying homogeneous transparent coats. White paints with a $TiO_2$ pigment-volume concentration of 35, as well as of 50%, gave films with excellent stability against wet-brushing.

The stability to stirring was investigated by stirring 50 ml. of latex in a plastic beaker with a horizontally fitted metal disc, diameter 3 cm., thickness 1.5 mm., the bottom of which was kept 1.5 cm. above the bottom of the beaker. The speed was 10,000 r.p.m. The stability to stirring was judged as excellent when after 30 minutes' stirring no coagulation had occurred.

The ion stability of latices was investigated by adding an equal volume of 5% by weight solutions of sodium chloride and calcium chloride.

To judge the freeze-thaw stability latices were kept for 24 hours at −20° C. and then for 24 hours at room temperature. This treatment was repeated five times.

To investigate the resistance to wet-brushing the pigmented latex was applied with a doctor knife to sandblasted glass plates and dried for 1 week. A nylon brush with a surface area of 21 cm.$^2$ and loaded with a weight of 500 g. was passed mechanically over the paint coat, which was continuously wetted with water. The number of brush strokes after which the paint coat begins to tear, is a measure of the mechanical stability. The brush resistance is judged as excellent when the paint coat is still perfectly intact after 10,000 strokes.

EXAMPLE II

The procedure of Example I, steps (a) to (e), inclusively, was substantially repeated wherein an equivalent amount of vinyl pivalate was used in lieu of the vinyl esters of the $C_9$–$C_{11}$ alpha-branched, saturated, aliphatic monocarboxylic acids. Latices and a white paint were prepared and tested (the quantity of dibutyl phthalate used was not 8% by weight as in Example I, but was 50% by weight of the aqueous emulsion and contained 52% by weight of dibutyl phthalate).

The stability against stirring, the ion stability and the freeze-thaw stability, as well as the properties of the dried films were excellent.

EXAMPLE III

The procedure of Example I was substantially repeated wherein the vinyl esters were derived from alpha-branched, saturated, aliphatic monocarboxylic acids containing $C_{15}$–$C_{17}$ carbon atoms and prepared by reacting $C_{14}$–$C_{16}$ cracked olefins with carbon monoxide and water in the presence of acid catalysts.

The monomer weight ratio was 60 parts of vinyl chloride, 39 parts of vinyl esters of $C_{15}$–$C_{17}$ monocarboxylic acids and 1 part of acrylic acid. No dibutyl phthalate emulsion was added.

Similar excellent properties were exhibited by the latices prepared and tested according to the procedures described in Example I (steps (a) to (e), inclusively).

We claim:
1. A semicontinuous, multistage process for the emulsion polymerization of a vinyl ester of an alpha-branched saturated, aliphatic monocarboxylic acid containing from 5 to 20 carbon atoms with at least one other copolymerizable monomer containing an olefinically unsaturated double bond which comprises the steps of:
   (1) filling a reactor with a 25% to 75% by volume charge of a preformed copolymer latex of said vinyl ester of an alpha-branched monocarboxylic acid and said other copolymerizable monomer,
   (2) adding the above-described comonomers to said reactor at a rate such that the reaction temperature is maintained between 30° and 150° C. until the reactor is filled,
   (3) passing from 25% to 75% by volume of the latex formed in the said reactor to a subsequent reactor, and then
   (4) repeating steps (2) and (3) a preselected number of times, said polymerization process being performed in the presence of a polymerization catalyst and from 0.1 to 10% by weight of the total monomers of a lyophilic protective colloid selected from the group consisting of cellulose and ethers and esters thereof.

2. A process as in claim 1 wherein the vinyl ester of the alpha-branched monocarboxylic acid is derived from an alpha-branched, saturated, aliphatic monocarboxylic acid containing from 9 to 20 carbon atoms.

3. A process as in claim 2 wherein the monocarboxylic acid contains from 9 to 11 carbon atoms and is prepared by reacting olefins with carbon monoxide and water in the presence of liquid acid catalysts.

4. A process as in claim 1 wherein the comonomers comprise (1) from 25 to 900 parts by weight of a vinyl ester of an alpha-branched, saturated, aliphatic monocarboxylic acid containing from 9 to 11 carbon atoms in the acid-molecule, (2) one hundred parts by weight of vinyl chloride and (3) from 0.5 to 5 parts per 100 parts of (1) and (2) of an alpha,beta-unsaturated carboxylic acid containing from 3 to 5 carbon atoms.

5. A process as in claim 4 wherein the alpha,beta-unsaturated carboxylic acid is acrylic acid.

6. A process as in claim 1 wherein the protective colloid is hydroxyethyl cellulose or carboxymethyl cellulose.

7. A process as in claim 1 wherein the copolymerization is performed in the presence of an anionic surface active agent selected from the group consisting of alkylaryl sulfonates, alkyl sulfonates, alkyl sulfates, sulfates of alcohol, ethoxylates, sulfates of alkyl-phenoxypolyethoxyethanols, sulfates and sulfonates of hydroxypropyl esters of monocarboxylic acids and sulfates of monoglycerides of monocarboxylic acids and nonionic surface active agent selected from the group consisting of reaction products of phenols with alkylene oxides having the general formula R—$C_6H_4$—O(—$CH_2$—$CH_2$—O—)$_n$H wherein R represents an alkyl group with 6 to 16 carbon atoms and $n$ is a number between 6 and 40 and reaction products of ethylene oxide with polypropylene glycol ethers.

8. A process as in claim 1 wherein the latex end product is adjusted to a pH value of between 7 and 9.

References Cited
UNITED STATES PATENTS

| | | | |
|---|---|---|---|
| 3,248,356 | 4/1966 | Snyder | 260—29.6 |
| 3,294,727 | 12/1966 | Grommers et al. | 260—29.6 |
| 3,390,109 | 6/1968 | Reuerdin et al. | 260—17 |

WILLIAM H. SHORT, Primary Examiner

L. M. PHYNES, Assistant Examiner

U.S. Cl. X.R.

260—17.4, 29.6, 29.7, 73, 80.81, 85.7, 87.5